April 18, 1967  J. A. KARNS  3,314,692
RETRACTABLE TRAILER TONGUE JACK
Filed Dec. 24, 1964  3 Sheets-Sheet 1
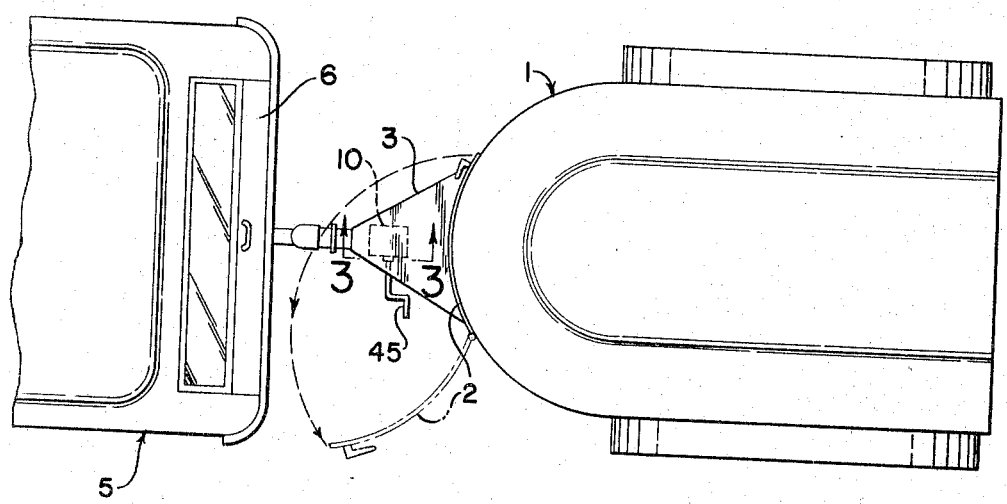
FIG. 1
FIG. 2
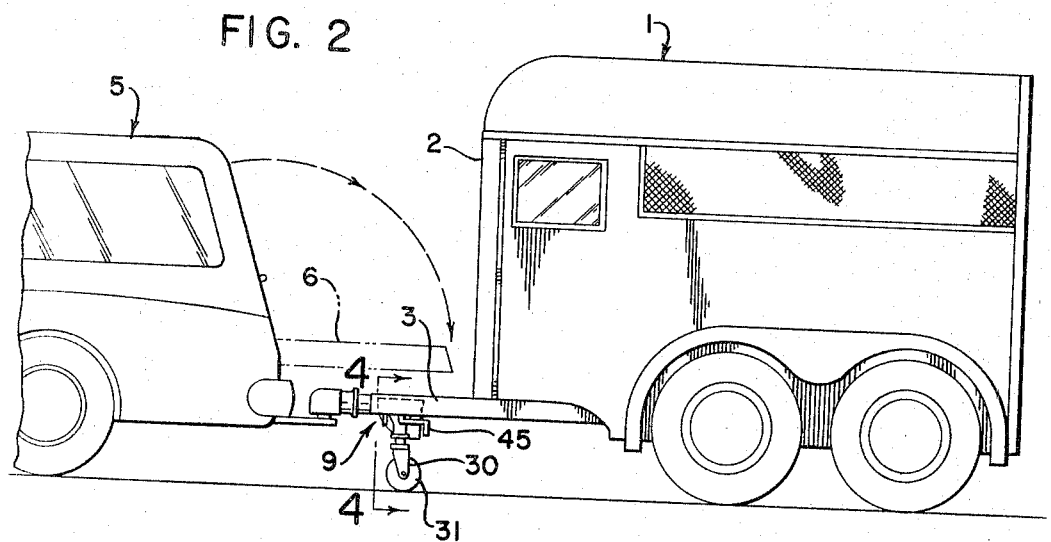
INVENTOR.
JAMES A. KARNS
BY *Gordon C. Mack*
ATTORNEY

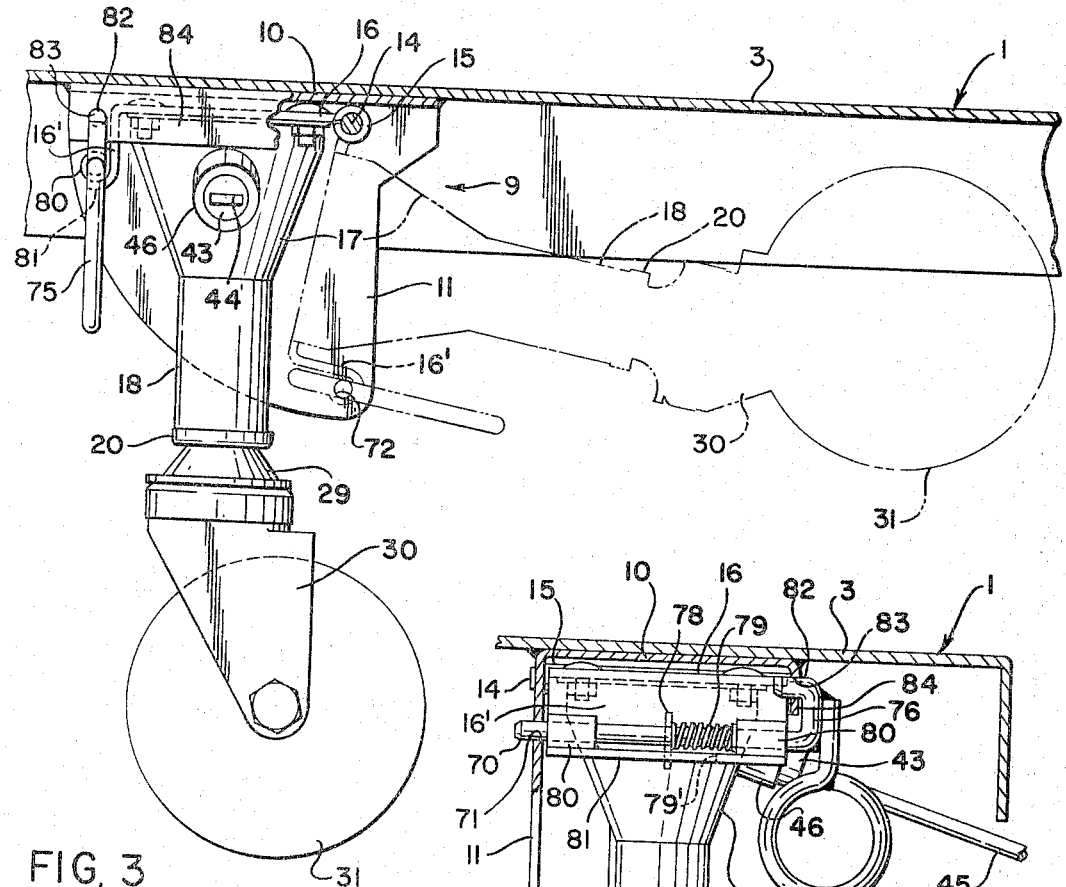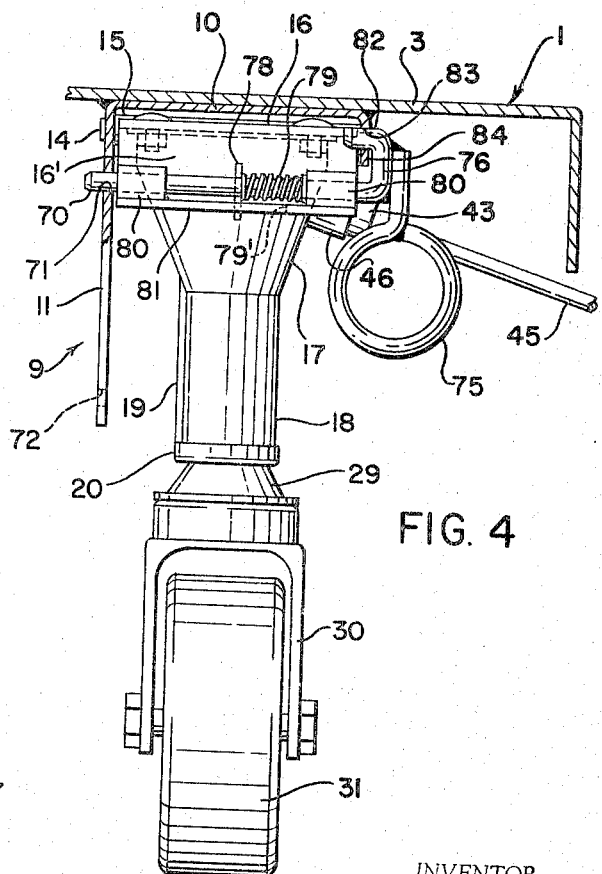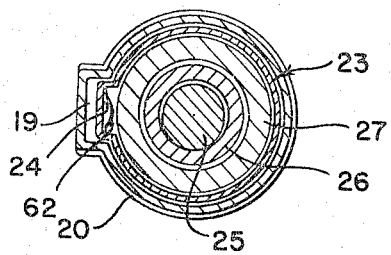

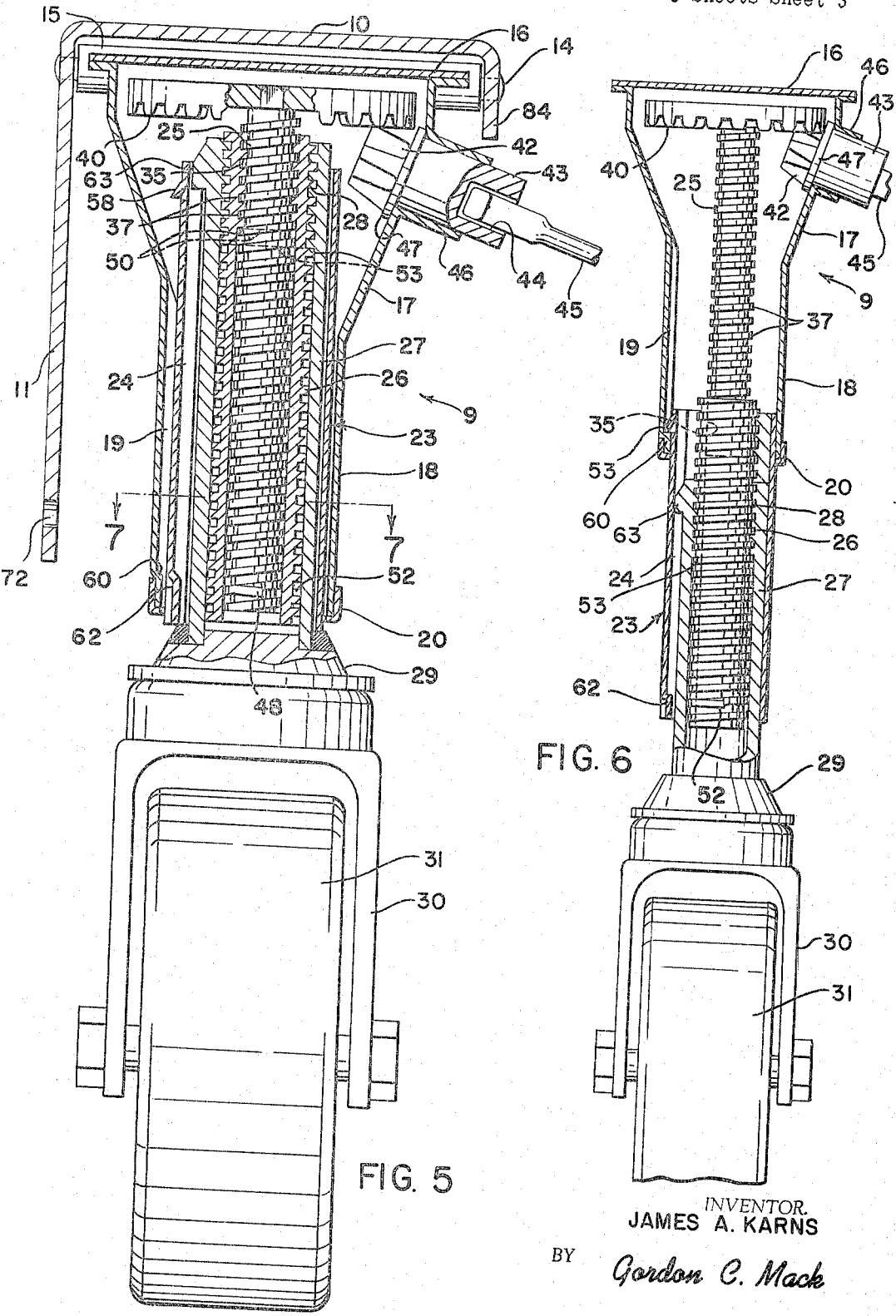

3,314,692
RETRACTABLE TRAILER TONGUE JACK
James A. Karns, 2605 Addyston Road,
Akron, Ohio 44313
Filed Dec. 24, 1964, Ser. No. 420,973
5 Claims. (Cl. 280—475)

This invention relates to a tongue jack for a trailer. The tongue jack is provided with wheel means (preferably a caster) and includes telescoping mechanism located entirely under the tongue for raising and lowering the tongue. The jack is swivelly mounted on the tongue so that it can be swung to an erect position to support the tongue and swung from this lowered position to a raised inoperative position.

The jack is designed primarily for use as the front support of a horse trailer. By locating the jack entirely under the tongue, the top of the tongue is kept free of any means which prevents a door located in the front of the trailer from being swung out over the tongue, or the tailgate from a station wagon or other vehicle to which the trailer is attached, from being lowered onto the tongue.

The telescoping mechanism for raising and lowering the jack is preferably a telescopic nest of intermeshed screws operated by a removable crank. Thus, the tongue of the trailer can be raised or lowered to the height of a hitch fastened to a truck or station wagon or other means for hauling the trailer, and because the jack is swivelly mounted, it can be raised out of operative position so as to rest the tongue on other support means when the trailer is not in use.

The invention is further described in connection with the drawings, which are illustrative only. In the drawings—

FIGURE 1 is a plan view of the trailer fastened to the rear of a station wagon;

FIGURE 2 is an elevation of the same;

FIGURE 3 is a side view on the line 3—3 of FIGURE 1, showing the jack in the supporting position in full lines, and out of operative position in phantom;

FIGURE 4 is a front view of the jack in operative position, on the line 4—4 of FIGURE 2;

FIGURE 5 is a section through the jack with the nest of screws telescoped in one another;

FIGURE 6 is a section of the same, on a smaller scale, showing the nest of screws extended; and FIGURE 7 is a section through the nest of screws, on the line 7—7 of FIGURE 5.

The trailer 1 may be of any design, but the invention is particularly adapted for use with a trailer having a front door 2 which swings out over the tongue 3 as indicated in FIGURE 1, free from any interference with the jack which is located entirely below the tongue. The trailer may be attached to any suitable type of vehicle for hauling it from one place to another. In FIGURES 1 and 2 it is shown attached to station wagon 5, and FIGURE 2 shows how the tailgate 6 of the station wagon may be swung down over the tongue 3.

Referring to FIGURES 3 to 7, it will be seen that cap means 9 includes a top portion 10 and a depending side portion 11, the top portion 10 being welded to the underside of the tongue (FIGURE 4). No part of the jack protrudes above this cap means. The ends of the swivel pin 14 are held in the cap means. The sleeve 15 rotatably surrounds the pin 14. One edge of the support plate 16 is attached to this sleeve and this plate is bent down at 16', as shown clearly in FIGURE 3, for a purpose to be described.

The jack is largely enclosed in a housing which comprises a downwardly tapering upper portion 17 with a cylindrical bottom portion 18; the keyway 19 (FIGURES 5, 7) extends longitudinally of the cylindrical portion. This housing rests in the cup 20 which is fastened to it. The housing is adapted to slide over the slidable sleeve 23 which is also cylindrical except for the hollow key 24 which is accommodated within the keyway 19. Within the slidable sleeve 23 is the telescopic screw nest composed of the screw 25, and the threaded shafts 26 and 27. The hollow outer shaft 27 is threaded internally at the top at 28. The base of this shaft is welded to the swivelable top 29 of the fork 30 which holds the caster 31.

There are just enough threads 28 in the top of the outer shaft 27 to support the inner shaft 26 when it is extended. Engaged with the internal threads 35 at the top of the shaft 26 are the threads 37 of the screw 25 to which the pinion 40 is welded. The pinion meshes with the gear 42 on the stud 43 with the slotted opening 44 in which the end of the removable crank 45 fits for extending and retracting the jack. The stud fits within the cylindrical flange 46 on the housing, and is positioned by collar 47.

One of the bottom threads 37 of the screw 25 is staked as indicated at 48 so that as the jack is extended, this stake thread will engage the shoulder 50 of the shaft 26 to prevent the screw 25 from being screwed out of this shaft. As the jack is extended and the staked thread 48 engages this shoulder 50 (or before it engages the shoulder 50), the shaft 38 rotates within the shaft 27 and it can be extended until the staked tooth 52 engages the shoulder 53 within the shaft 27.

As the telescoped screws are extended, the housing slides up over the slidable sleeve 23 (FIGURE 6) until the outward protrusion 58 on the slidable sleeve engages the inwardly stepped portion 60 at the bottom of the keyway 19 of the housing. The jack can be extended until the inwardly indented portion 62 at the bottom of the slidable sleeve engages the protrusion 63 at the top of the shaft 27. The nested keys prevent the housing from turning with respect to the top 29 of the fork.

With this arrangement, by merely inserting the crank 45 into the slot in the stud 43 which is rotatably mounted within the collar 67 on the housing, the jack can be lengthened or shortened to any desired height. No portion of the jack extends into or above the tongue 3 of the trailer.

The housing is fastened to the sleeve 15 (FIGURES 3, 5) which is rotatably mounted about the pin 14. The lock pin 70 (FIGURE 4) is J-shaped. Its inner end can be positioned in either of the openings 71 and 72 in the depending portion 11 of the cap 9 to hold the wheel in either the erect or the horizontal position. The pin 70 is retracted by pulling on the finger hole 75 which is welded to the upturned portion 76 of the outer end of the pin. The spring pin 78 which passes through the horizontal portion of the pin 70 confines the spring 79 within the space between this pin 78 and one of the two bearings 80 in which the pin 70 slides. The bearings 80 are welded to the outwardly extending edge 81 of the support plate 16. The bottom of this pin 78 slides in the opening 79' and maintains the portion 76 of the J-pin from turning in the bearings. The tip 82 o fthe J-pin which extends horizontally from the portion 76 is bent inwardly and fits in the opening 83 in the downwardly bent portion 84 of the cap means. This positions the finger hole 75 below the pin so that it is readily accessible.

The caster 31 and its housing 18 can be raised by disengaging the J-lock pin from the openings 71 and 83, swinging the housing to the position shown in FIGURE 3, and then releasing the pin so that its inner end is engaged in the opening 72 and its tip is re-engaged in the opening 83. To hold the housing erect, both ends 70 and 82 of the J-pin are engaged in their openings 70 and 83. This gives a rigid construction which withstands the jolts, etc. which the caster encounters when the trailer is in motion.

To raise or lower the trailer tongue, it is only necessary to insert the crank 45 and turn it one way or the other until the jack is of the desired height. To move the caster from operative to inoperative position, or vice versa, it is merely necessary to pull the pin 70 out to disengage the pin from the cap means, swing the housing and then release the pin and allow it to snap back, and see that it is properly engaged with the cap means in the new position.

The invention is covered in the claims which follow.

What I claim is:

1. A tongue jack which includes cap means with a depending positioning plate with upper and lower positioning holes therein, a swivel pin the ends of which are held in the cap means, a sleeve rotatably mounted over the pin, a housing the upper part of which is attached to the sleeve, pin means slidable in said upper part of the housing for engagement in one of said holes in the positioning plate, the lower portion of the housing being generally cylindrical with a keyway extending axially from one side thereof, the housing comprising a sliding sleeve within and substantially concentric with said upper part of the housing with a hollow key extending substantially the length thereof and located within said keyway, a wheel and a fork holding the same with an outer shaft swivelly connected with the fork, an inner shaft with external threads meshed with internal threads on the outer shaft, a screw the threads of which mesh with internal threads on the inner shaft and means for rotating the screw, said screw and shafts being within the housing.

2. The tongue jack of claim 1 in which said housing is attached to a support plate which is attached to said sleeve, said slidable pin means is a J-pin which is slidable in bearings attached to said support plate, and there is a second depending plate which is rigid with respect to the cap means, with an opening in said second depending plate adapted to receive the bent-back end of the J-pin to prevent the J-pin from turning in the bearings, and spring means which tends to maintain said bent-back end of the J-pin in its opening.

3. A tongue jack which includes cap means, a housing and wheel attached thereto which housing and wheel are pivotally supported by the cap means, a J-pin slidable in bearings supported by the housing, means attached to the cap means with an opening therein in which the bent-back tip of the J-pin is engageable to prevent the J-pin from turning in the bearings, and spaced from said means with an opening therein there is a further means with two openings therein in one of which the other end of the J-pin is engaged when the jack is held erect and in the other of which the J-pin is engaged when lifted from the erect position, the J-pin being slidable out of engagement with each of said openings.

4. In combination a trailer and station wagon with a tongue on the trailer which tongue is connected with the station wagon adjacent the rear of its body, the trailer having a door at the front that swings outwardly above the tongue, a tail gate on the station wagon which swings down over the tongue, and a tongue jack located entirely below the tongue, which tongue jack includes a wheel, between the wheel and the tongue (1) a telescopic housing and (2) a telescopic screw nest within the housing and crank means for operating the same, a J-pin slidable in bearings supported by the tongue, means rigidly positioned with respect to the tongue with an opening therein in which the bent-up tip of the J-pin is engageable to prevent it from turning, and two other openings in means rigidly positioned with respect to the tongue in one of which the J-pin is engageable when the jack is erect and in the other of which the J-pin is engageable when the jack is lifted from the erect position, the J-pin being slidable in the bearings out of engagement with each of said openings.

5. A tongue jack which includes a housing and wheel attached thereto which are pivotally supported by the tongue, a J-pin slidable in bearings supported by the housing, means rigidly positioned with respect to the tongue with an opening therein in which the bent-back tip of the J-pin is engageable to prevent the J-pin from turning in its bearings, and spaced from said means with an opening therein further means with two openings therein in one of which the other end of the J-pin is engaged when the jack is held erect and in the other of which the J-pin is engaged when lifted from the erect position, the J-pin being slidable out of engagement in each of said openings.

References Cited by the Examiner

UNITED STATES PATENTS

| 1,899,131 | 2/1933 | Bedard et al. | 254—86 X |
| 2,069,012 | 1/1937 | Lynes | 254—86 X |
| 2,096,050 | 10/1937 | Lucker | 254—102 |
| 2,153,722 | 4/1939 | Loughmiller | 254—86 |
| 2,167,520 | 7/1939 | Claud-Mantle | 280—512 |
| 2,213,840 | 9/1940 | Hoecker | 254—86 X |
| 2,853,316 | 9/1958 | Moss | 280—475 |

FOREIGN PATENTS

| 497,390 | 12/1938 | Great Britain. |
| 1,139,275 | 2/1957 | France. |

LEO FRIAGLIA, *Primary Examiner.*